United States Patent [19]

Redzinski et al.

[11] 4,300,652
[45] Nov. 17, 1981

[54] SOFT SHIFT REVERSING CONTROL SYSTEM

[75] Inventors: Gilbert E. Redzinski, Niles; Donald N. Pinne, Jr., St. Joseph; Joseph R. Den Bleyker, Stevensville, all of Mich.

[73] Assignee: Clark Equipment Company, Buchanan, Mich.

[21] Appl. No.: 21,052

[22] Filed: Mar. 16, 1979

[51] Int. Cl.³ ............................................. B60K 20/02
[52] U.S. Cl. ................................. 180/336; 180/271; 192/4 C; 340/53; 340/62
[58] Field of Search ..................... 180/271, 70 R, 336; 192/4 C; 340/53, 62

[56] References Cited

U.S. PATENT DOCUMENTS

| | | | |
|---|---|---|---|
| 3,381,770 | 5/1968 | Fauchere | 192/4 C |
| 3,858,696 | 1/1975 | Shore | 192/4 C |
| 3,910,389 | 10/1975 | Pleier | 192/4 C |
| 3,913,700 | 10/1975 | James | 180/271 |
| 3,998,191 | 12/1976 | Beyerlein | 180/176 |
| 4,090,414 | 5/1978 | White | 74/733 |
| 4,161,717 | 7/1979 | Hoover | 340/62 |

Primary Examiner—John P. Silverstrim
Attorney, Agent, or Firm—Reising, Ethington, Barnard, Perry & Brooks

[57] ABSTRACT

An electronic reversing control system is disclosed for preventing excessive shock loading of the vehicle driveline when the operator calls for vehicle reversal with the vehicle in motion. A digital logic forward-reverse control channel links the operator's direction control lever and the reversing means in the transmission. When reversing is called for the control channel logic is inhibited by a speed responsive signal unless the vehicle speed is below a predetermined value. A speed retarding control channel controls the vehicle brakes and throttle when a reversing signal is produced provided the speed is above the predetermined value. Additionally, the system is provided with a logic power loss detector which responds to power supply failure and automatically shifts the transmission into neutral.

15 Claims, 9 Drawing Figures

SOFT SHIFT REVERSING CONTROL SYSTEM

TECHNICAL FIELD

This invention relates to power transmitting mechanisms of the type including means for reversing the direction of rotation of the driveline; more particularly it relates to an improvement for preventing excessive shock or transient loading of the driveline when a reversal is effected.

BACKGROUND ART

In the operation of certain earth moving and other construction vehicles, efficient use of the vehicle requires frequent reversal of direction. When a drive reversal is executed with the vehicle in motion, a severe strain or damage may be imposed on the driveline and additionally the sudden movement may be uncomfortable or even hazardous to the operator of the vehicle. Heretofore, control systems have been devised for automatically reducing the speed of the vehicle before allowing drive reversal to take place.

The Fauchere U.S. Pat. No. 3,381,770 discloses a reversing control system for a vehicle to prevent excessive shock loading of the driveline when the operator calls for vehicle reversal with the vehicle in motion. In this system, a manually initiated reversing signal causes actuation of the drive reverser when the vehicle speed is below predetermined value; however, if the speed is above that value, the reversing signal causes actuation of the brakes and actuation of the reverser is prevented until the speed is reduced below the predetermined level. The Faucher control system is a servo-mechanism which requires feedback devices for indicating the respective positions of the reverser actuator and the clutch to control the sequencing of the servo-actuated components. Thus, this system requires the installation of limit switches and relays in operative relation with the components of the driveline of the vehicle.

The James U.S. Pat. No. 3,913,700 discloses a reversing control system for protecting the driveline of a vehicle when the operator calls for reversing of vehicle direction. A manually initiated reversing signal when the vehicle is in motion causes the brake to be applied and the engine speed to be reduced to a preset level and then the transmission is reversed. The system of the James Patent utilizes switch contacts for speed sensing and switch contacts for indicating the position of the drive direction selector which are connected in circuit with plural contacts of a relay controlled by the switches. In this control circuit, the control current must flow through the speed sensing and direction indicating switches to the solenoid valve for the transmission reverser and for the brake and throttle control means.

It is also known in the prior art to utilize hydraulic control systems to prevent reverse shifting of a transmission until the vehicle speed is reduced to a predetermined value. Such systems are disclosed in the Shore U.S. Pat. No. 3,858,696, Pleir U.S. Pat. No. 3,910,389 and the White U.S. Pat. No. 4,090,414.

A general objective of the present invention is to provide a transmission reversing control system which avoids the difficulties and disadvantages of the prior art and affords ease of installation and reliability in operation.

DISCLOSURE OF THE INVENTION

In accordance with this invention, a transmission control system permits reversal only when the vehicle speed is below a predetermined value. Further, if the operator calls for reversing when the speed is above the predetermined value, the system automatically actuates retarding means such as brakes or a throttle retarder, to reduce the vehicle speed. This is accomplished by a forward-reverse control channel including electronic logic gates for controlling a forward-reverse actuator in response to a direction command signal; the forward-reverse control chanel is subject to inhibiting means responsive to a speed signal for inhibiting the actuator when the speed is above a predetermined level. Additionally, a speed retarder control channel comprising electronic logic gates is adapted to actuate vehicle speed retarding means in response to a reversing command signal; the channel is also subject to inhibiting means responsive to the speed signal to inhibit the actuator when the speed is below the predetermined level.

According to the invention, there is provided a drive reversing control system comprising a direction signal generator responsive to the position of a forward-reverse selector means for producing a direction command signal. The direction command signal is applied through a first gate means to a first actuating means which is adapted to be connected with the transmission reversing means. A speed signal generator connected with the driveline of the vehicle produces a speed signal which is applied to an inhibit signal means which produces an inhibit signal when the speed is above a predetermined value. The inhibit signal means is coupled with the first gate means and inhibits the output thereof to prevent actuation of the reversing means when the speed is above the predetermined value.

Additionally, in accordance with this invention, the reversing control system includes means coupled with the direction signal generator for producing a reversing command signal when the direction selector means is moved between forward and reverse positions. The reversing command signal is applied through a second gate means to a second actuating means adapted to be connected with the vehicle motion retarding means. The inhibit signal means is coupled with the second gate means and inhibits the output thereof when the speed is below the predetermined value whereby the second actuating means is operative to reduce the speed of the vehicle when the speed is above the predetermined value.

Additionally, according to the invention, the electronic control system constitutes the only link between the operator's forward-reverse lever and the forward-reverse actuator at the transmission. For safety purposes, means are provided to automatically shift the transmission into neutral and to sound a warning signal in the event of loss of logic level voltage to the logic circuits.

A more complete understanding of this invention may be obtained from the detailed description that follows taken with the accompanying drawings.

BEST MODE FOR CARRYING OUT THE INVENTION

Referring now to the drawings there is shown an illustrative embodiment of the invention in a reversing control system for the driveline of the vehicle. A typical application of the invention is in a heavy duty construction vehicle.

Figure 1:
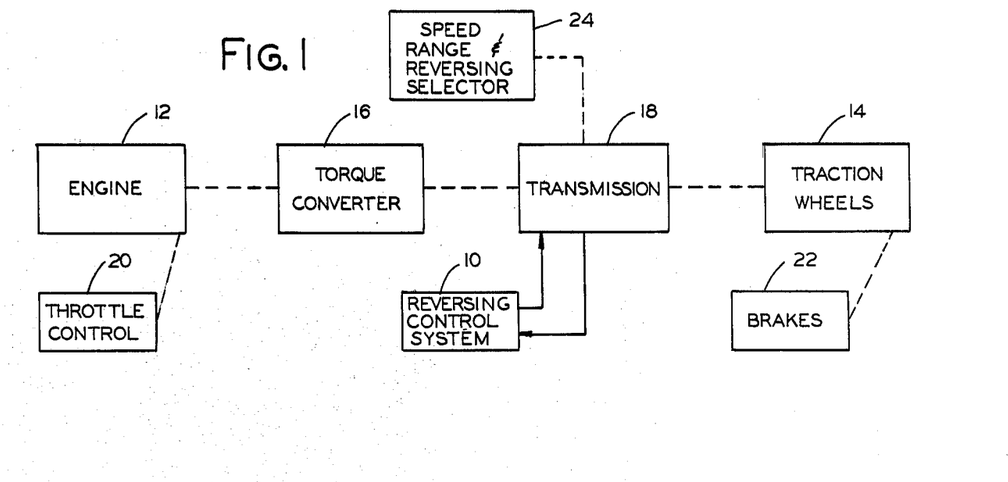
FIG. 1 is a block diagram of a vehicle system including the reversing control system of this invention.
Figure 2:
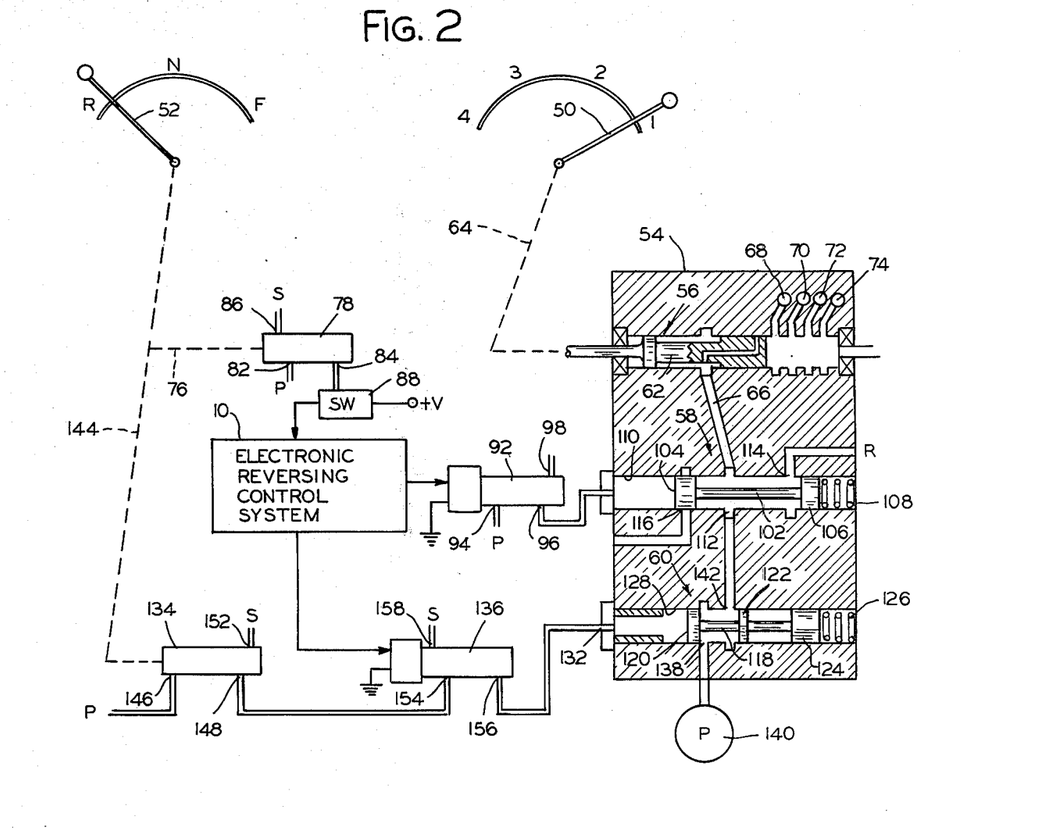
FIG. 2 is a diagram of the hydraulic control system.

FIG. 1 is a block diagram which shows the reversing control system 10 of this invention in combination with the driveline of a vehicle. The engine 12 of the vehicle is connected with the traction wheels 14 through a torque converter 16 and a change-speed, reversible drive transmission 18. The engine 12 is provided with a throttle control 20 and the vehicle traction wheels are provided with brakes 22 in a conventional manner. Both the throttle control and the brakes are adapted for manipulation by the vehicle operator, suitably with a servo-actuator, as is common with heavy duty vehicles. The transmission 18 is also provided with a speed range and reversing selector means 24 which enables the operator to manually select a speed range of the transmission and the direction of rotation of the transmission output shaft. The reversing control system 10 comprises an electronic circuit which receives electrical input signals from the transmission 18 and supplies electrical control signals to the transmission 18, as indicated in FIG. 2. The reversing control system 10 will be described in detail subsequently.

Before proceeding with the description of the electronic reversing control system 10, it will be helpful to consider the hydraulic control system of the transmission 18. A hydraulic control system for a typical heavy duty transmission for an earth moving vehicle is shown in FIG. 2. In this control system the operator is provided with a speed range control lever 50 and a separate reversing control lever 52; it will be understood however, that a single control lever for both speed range and reversing may be provided. The transmission 18 is provided with a control cover 54 which contains certain control valves for the transmission in a conventional manner. The control cover 54 is provided with a speed range selector valve 56, a forward-reverse control valve 58 and a neutral control valve 60. The speed range selector means including the selector lever 50 and the control valve 56 do not enter into the operation of the present invention. They are illustrated as part of the environment and, for simplicity, a manually actuated arrangement is shown. The speed range control valve 56 includes a spool 62 which is adapted to be positioned by the selector lever 50 under manual control of the vehicle operator through a mechanical linkage 64. The selector lever 50 is adapted to be set in one of four positions corresponding to speed ranges 1, 2, 3, and 4 on the transmission 18. The control valve 56 is adapted to selectively direct fluid pressure from a supply passage 66 to the transmission clutches corresponding to the different speed ranges. The valve spool is movable through successive positions so that the supply port 66 communicates successively with the outlet ports 68, 70, 72 and 74 which, in turn, are connected with selected speed clutches. Thus the speed range of the transmission is manually selected by positioning of the selector lever 50.

The reversing control system of this invention utilizes the existing shift control means of the transmission to which it is applied. In the illustrative example, the control cover 54 of the transmission 18 is provided with a hydraulically actuated reversing control valve 58 and a hydraulically actuated neutral control valve 60. The reversing control valve 58 is controlled by the electronic reversing control system 10 which receives a command signal initiated by the vehicle operator with the reversing control lever 52. The control lever 52 is connected through a mechanical linkage 76 to a control valve 78. The control valve 78 has a pressure inlet port 82 which is connected to the source 140 of hydraulic fluid pressure, an outlet port 84 and a drain port 86 which is returned to the sump. The outlet port 84 is connected with a pressure switch 88 which is closed in response to fluid pressure to apply a command signal to the input of the reversing control system 10. When the selector lever 52 is in the neutral and forward positions the outlet port 84 is connected with the drain port 86 and the switch 88 is opened. When the selector lever 52 is in the reverse position the control valve 78 connects the pressure inlet port 82 with the outlet port 84 and the switch 88 is closed. The electronic reversing control system 10 is operatively connected with the reversing control valve 58 in the transmission control cover 54 by a forward-reverse solenoid valve 92. The solenoid valve includes a pressure supply port 94 connected with the source of fluid pressure, an outlet port 96 and a drain port 98. When the solenoid valve 92 is energized by the output of the electronic reversing control system 10, the pressure supply port 94 is in communication with the outlet port 96 and fluid pressure is applied to the reversing control valve 58. When the solenoid valve is deenergized, the outlet port 96 is connected with the drain port 98 and the fluid pressure in the valve 58 is exhausted. The reversing control valve 58 is provided with a spool 102 having a pair of lands 104 and 106. The land 106 is seated against a coil spring 108. The valve spool is movable in a chamber 110 and fluid pressure may be admitted from the solenoid valve 92 to the chamber 110 against the valve land 104. The reversing control valve 58 is provided with an inlet port 112 connected with the source of fluid pressure, as will be described below. It is also provided with an outlet port 114 which is connected with the reverse clutch of the transmission. Another outlet port 116 is connected with the forward clutch of the transmission. When the solenoid valve 92 is energized fluid under pressure is supplied to the valve chamber 110 and the spool 102 is in the position shown which causes fluid pressure to be supplied to the reverse clutch. When the solenoid valve 92 is deenergized the valve spool 102 is moved by the coil spring 108 to uncover the port 116 and fluid pressure is applied to the forward clutch.

The neutral control valve 60 is adapted to control the supply of fluid pressure from the pressure source to the reversing control valve 58 and the speed range selector valve 56. If the neutral control valve 60 is closed, fluid pressure is removed from the reversing control valve 58 and neither the forward nor reverse clutch can be energized and the transmission is placed in neutral. The neutral control valve 60 comprises a valve spool 118 having spaced valve lands 120, 122 and 124. The valve land 124 is seated against a coil spring 126 and the valve land 120 is disposed in a chamber 128 adapted to receive fluid pressure through an inlet port 132 through a control valve 134 and a neutral safety solenoid valve 136, which will be discussed presently. The neutral control valve 60 has a pressure inlet port 138 connected to the source of pressure 140. The control valve 60 also has an outlet port 142 connected with the inlet port 112 of the reversing control valve 58. When fluid pressure is applied to the chamber 128 the valve spool 118 is in the position shown and the valve is open to admit fluid pressure through the inlet port 138 to the outlet port 142. In this condition the transmission can be placed in either forward or reverse drive in any one of the speed ranges. When the valve chamber 128 is relieved of pressure, the valve spool 118 is moved by the coil spring 126 to close the valve so there is no communication between the inlet port 138 and the outlet port 142.

The transmission is shifted to neutral under the control of either the control valve 134 or the neutral safety solenoid valve 136. The control valve 134 is actuated by the control lever 52 through a mechanical linkage 144. The control valve has a pressure inlet port 146, an outlet port 148 and a drain port 152. With the selector lever 52 in either the reverse or forward positions, the pressure supply port 146 is connected with the outlet port 148 and fluid pressure is applied to the solenoid valve 136. The solenoid valve 136 has a pressure supply port 154, an outlet port 156 and a drain port 158. With the solenoid valve 136 deenergized, the inlet port 154 is connected with the outlet port 156 and hence fluid pressure is applied to the valve chamber 128 to hold the neutral valve 60 in the open position. When the control lever 52 is moved to the neutral position the outlet port 148 is connected with the drain port 152 and the fluid pressure in the valve chamber 128 is exhausted. Accordingly the neutral control valve 60 is closed and the transmission is shifted to neutral. The transmission may also be shifted to neutral under the control of the electronic reversing control system 10 and the solenoid valve 136. Under certain conditions, which will be described below, the neutral safety solenoid 136 is energized. This causes the outlet port 156 to be connected with the drain port 158 and the fluid pressure in the chamber 128 is exhausted. Accordingly, the valve spool 118 is moved by the spring 126 to close the neutral control valve 60 and shift the transmission to neutral.

According to the invention, as indicated in FIGS. 1 and 2, the electronic reversing control system 10 is interposed as the sole link between the manual reversing control lever and the drive reversing means in the transmission 18. In this arrangement, a vehicle speed signal is used to modify the action of the reversing control system and the control system may be used to control the reduction of vehicle speed when drive reversal is called for.

Figure 3:
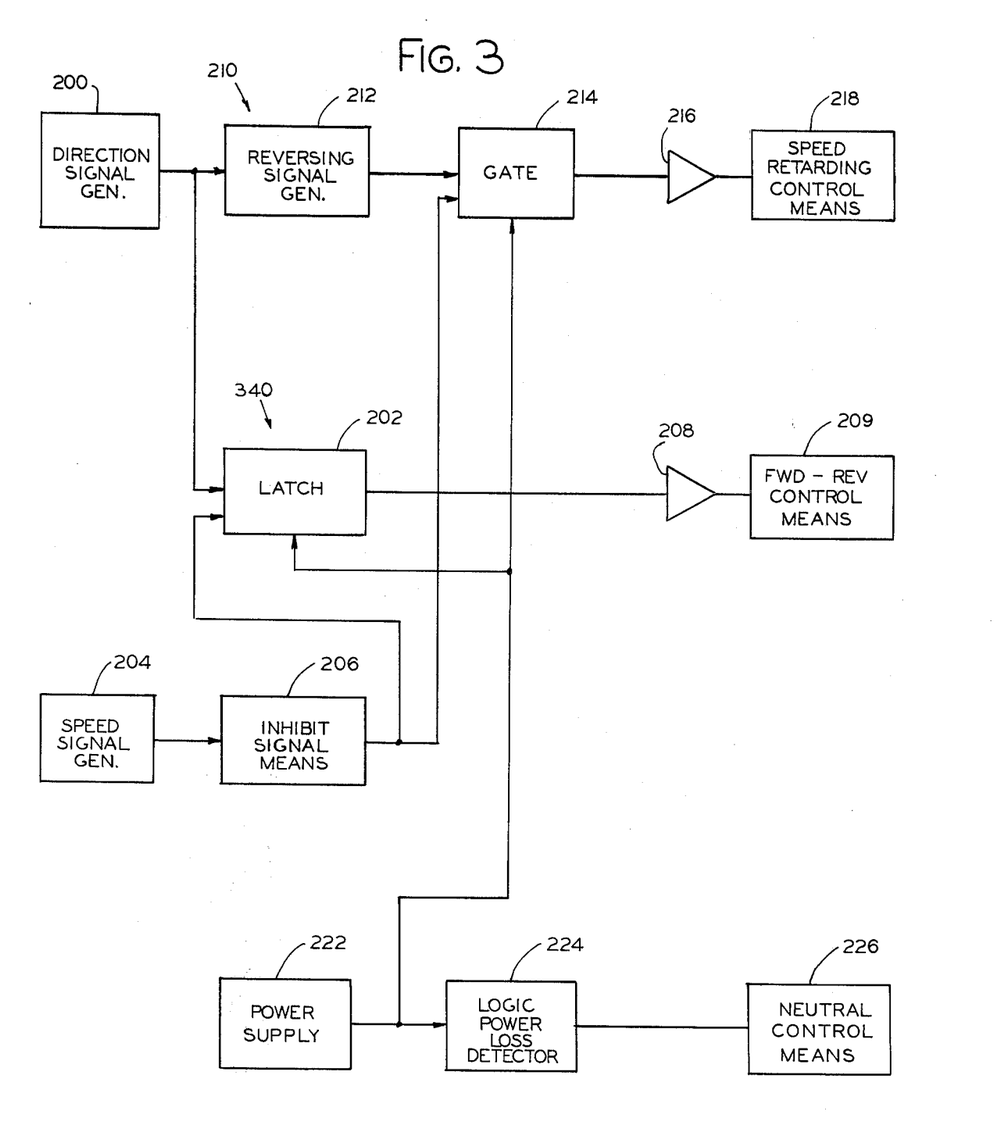
FIG. 3 is a block diagram of the electronic control system.

The electronic reversing control system is shown in block diagram in FIG. 3. The system comprises a direction signal generator 200 which is responsive to the position of the direction selector means, i.e. the reversing lever 52 of FIG. 2. The direction signal generator produces a logic signal of one state corresponding to forward direction and to neutral and it produces a logic signal of the other state corresponding to reverse position. The output of the direction signal generator is applied to one input of a reversing control channel 340 including a gate means or latch 202. A speed signal generator 204 is operatively connected with the driveline of the vehicle and produces a signal corresponding to actual vehicle speed. The speed signal is applied to the input of an inhibit signal means 206 which produces a logic output signal which is in one logic state when the speed signal exceeds a predetermined value and is in the other logic state when the speed signal is less than the predetermined value. The inhibit signal is applied to the inhibit input of the latch 202. The latch 202 functions as a storage gate means and it memorizes the direction command signal applied to its data input until the direction command signal is changed and then it memorizes the new command signal. The latch 202 produces a logic signal at its output corresponding to the current command signal applied to its data input only when the inhibit signal corresponds to a vehicle speed below the predetermined value. If the inhibit signal corresponds to the vehicle speed above the predetermined value, the output of the latch 202 remains in a logic state corresponding to the previous direction command signal. The output of the latch 202 is applied through an amplifier 208 to a forward-reverse control means 209. The forward-reverse control means is actuated in response to a change of direction control signal only when the vehicle speed is less than the predetermined value.

The reversing control system also comprises a speed retarding control channel 210 which includes a reversing signal generator 212 connected with the output of the direction signal generator 200. The reversing signal generator is operative to produce a reversing command signal in response to each change of the direction command signal. The reversing command signal is applied to one input of a gate 214 which has another input connected with the output of the inhibit signal means 206 to receive the inhibit signal. A reversing command signal causes the output of gate 214 to be in a first logic state when the inhibit signal indicates that the vehicle speed is above the predetermined level and to be in a second logic state when the vehicle speed is below the predetermined level. The output of the gate 214 is applied through an amplifier 216 to speed retarding control means for the vehicle.

A power supply 222 is provided for supplying logic level voltage to the electronic circuits. In FIG. 3, connections are shown from the power supply 222 to the latch 202 and the gate 214; it will be understood that the power supply is also connected to the other circuits of FIG. 3. As mentioned above, the electronic reversing control system is the only link between the reversing control lever and the reversing means of the transmission. Accordingly, it is desirable to provide a failsafe arrangement so that the transmission will automatically shift to neutral in the event that the power supply for the control circuit should fail. For this purpose, a logic power loss detector 224 is provided. The supply voltage from the power supply 222 is applied to the input of the power loss detector and the output of the detector is connected with a neutral control means 226 for the transmission.

Figure 4:
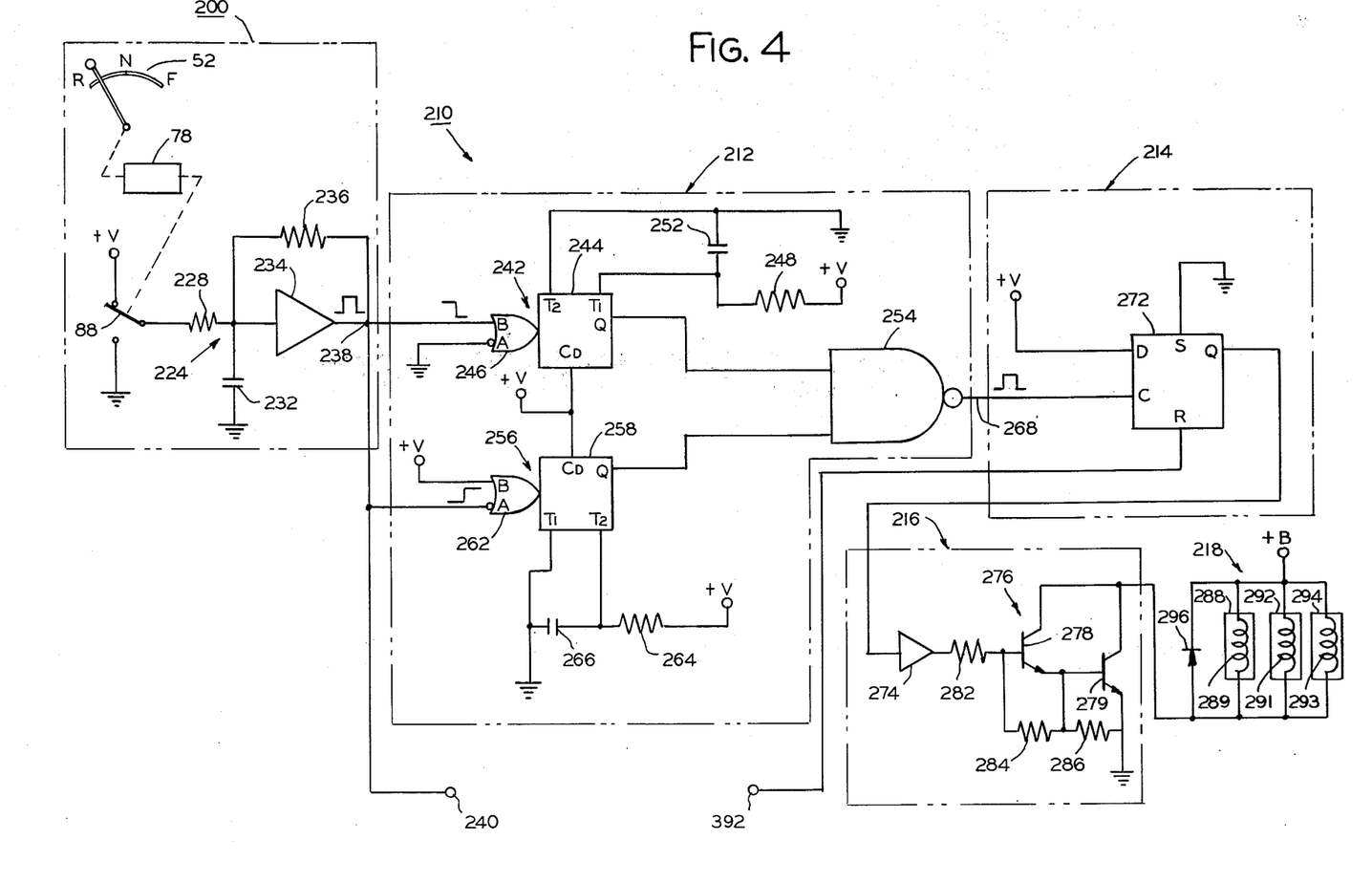
FIGS. 4, 5, and 6 taken together are a schematic diagram of the system of FIG. 3.

The reversing control system will now be described in greater detail with reference to the schematic diagrams of FIGS. 4, 5 and 6. FIG. 4 depicts the direction signal generator 200 together with the vehicle speed retarding control channel 210. The direction signal generator 200, referred to above, comprises the reversing lever 52, the reversing control valve 78 and the pressure switch 88. The pressure switch 88 is adapted to produce a logical high output signal when the reversing lever 42 is in the reverse position. For this purpose, the switch 88 has one fixed contact connected with the source of logic voltage and the other fixed contact connected with ground. The movable contact is closed against the first fixed contact in response to high fluid pressure from the valve 78 and the movable contact is disengaged from the first contact in response to low fluid pressure, corresponding to neutral and forward position of the reversing lever. Thus the switch 88 produces a logical high signal for a reverse command and a logical low signal for neutral and forward commands. In order to remove undesired transients from the logic signal, the switch output is connected to an anti-bounce circuit 224. This circuit includes a series input resistor 228 and a shunt capacitor 232. An amplifier 234 has its input connected to the junction of the resistor 228 and capacitor 232 and a feedback resistor 236 is connected between the output and the input of the amplifier. The direction command signal is taken from the output 238 of the amplifier 234.

The direction command signal produced by the direction signal generator 200 is applied to the inputs of the reversing signal generator 212. The reversing signal generator 212 is adapted to produce a logical high output pulse in response to each change in the direction command signal. In other words, the same logical high output pulse will be produced when the reversing lever 52 is moved from reverse to forward as when it is moved from forward to reverse. For this purpose, a dual monostable multivibrator is used in the reversing signal generator. It is an integrated circuit type MC14528B available from Motorola Semiconductors, Inc. of Phoenix, Arizona. The dual monostable multivibrator comprises a first multivibrator 242 which responds to a negative-going input pulse for producing an output pulse of predetermined duration. Multivibrator 242 comprises a flip-flop 244 having a NOR gate input 246. A noninverting input of the NOR gate is connected with the output 238 of the direction signal generator and an inverting input of the NOR gate is connected with ground. The clock input of the flip-flop 244 is connected with the logic voltage source. The timing input T1 is connected through a resistor 248 to the logic voltage source, the timing input T2 is connected to ground and a capacitor 252 is connected across the timing inputs. The Q output of the flip-flop 244 is applied to one input of a NAND gate 254. The monostable multivibrator 256 is adapted to produce an output pulse of a predetermined duration in response to a positive-going input pulse. The multivibrator 256 comprises a flip-flop 258 having a NOR gate input 262. A noninverting input of the NOR gate is connected with the logic voltage source and an inverting input is connected with the output 238 of the direction signal generator. The clock input of the flip-flop 258 is connected with the logic voltage source. The timing input T2 is connected through a resistor 264 to the logic voltage source and the timing input T1 is connected to ground. A capacitor 266 is connected between the timing inputs. The Q output of the flip-flop 58 is connected with the other input of the NAND gate 254. When a logical high pulse is applied to either input of the NAND gate 254, a logical high pulse is produced at the output of the NAND gate. Thus, the reversing signal generator 212 produces a reversing command signal which comprises a logical high pulse of predetermined duration upon each occurrence of a change of the direction command signal.

The output of the reversing signal generator 212 is applied to the input of the gate means 214. The gate means 214 is adapted to produce a speed retarding control signal in response to a reversing command signal, provided that the vehicle speed is above a predetermined value. For this purpose, the gate means 214 comprises a type D flip-flop 272. It is an integrated circuit, suitably one-half of a type MC14013B available from Motorola. The reversing command signal is applied to the clock input of the flip-flop. The data input of the flip-flop is connected to the logic voltage source and the set input is connected to ground. The reset input of the flip-flop 272 is connected through a conductor 392 to the output of the inhibit signal means 206 to receive the inhibit signal. The Q output of the flip-flop 272 is connected through the amplifier 216 to the speed retarding control means 218. The flip-flop 272 is operative to produce a logical high signal at the Q output in response to a logical high pulse at the clock input, provided that a logical low signal is applied to the reset input. In other words, a reversing command signal pulse at the input of the gate means 214 will produce a logical high voltage at the Q output if and only for so long as the inhibit signal at the reset input is a logical low, corresponding to vehicle speed above the predetermined value.

The output of the gate means 214 is applied to the amplifier 216. The amplifier includes a buffer amplifier 274 and a driver amplifier 276 in the form of a Darlington circuit. The driver amplifier comprises transistors 278 and 279 having their collectors connected together and the emitter of transistor 278 connected with the base of transistor 279 with the emitter of transistor 279 connected to ground. The output of the buffer amplifier 274 is connected through a resistor 282 to the base of the transistor 278. A resistor 284 is connected between the base and emitter of transistor 278 and resistor 286 connected between the base and emitter of transistor 279. The output of the amplifier 216 is taken from the collector of transistor 279 and represents the speed retarding command signal. This output signal is applied to the speed retarding control means 218.

Figure 7:
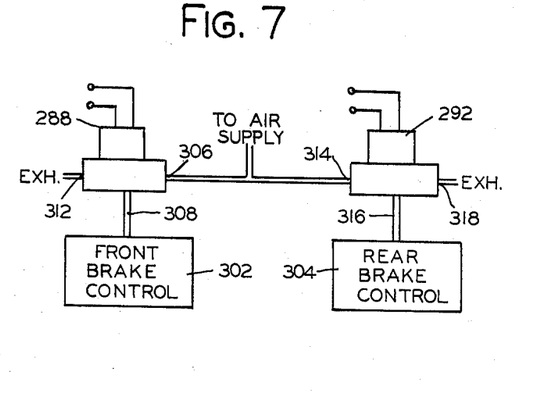
FIG. 7 shows brake control means.
Figure 8:
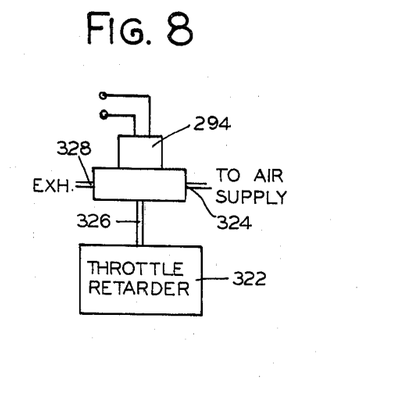
FIG. 8 shows throttle control means.

The speed retarding control means 218 comprises a set of control devices in the form of solenoid valves 288, 292 and 294. The solenoid windings 289, 291 and 293 of the respective solenoid valves are connected in parallel with each other and have one common terminal connected with the voltage source +B and another common terminal connected with the collector of the driver transistor 279. A protective diode 296 is connected in parallel across the solenoid windings. When the gate means 214 produces a logical high speed retarding control signal, the driver amplifier 276 is conductive and the solenoid valves 288, 292 and 294 are energized. The retarding control means is shown in greater detail in FIG. 7 and FIG. 8. The solenoid valve 288 is adapted to actuate the front brake control 302 and the solenoid valve 292 is adapted to actuate the rear brake control 304. The solenoid valve 288 is supplied with pneumatic pressure through an inlet conduit 306. When the valve 288 is energized, the pneumatic pressure is applied through the valve to the outlet conduit 308 and thence to the front brake control 302 to apply the front brakes of the vehicle. When the solenoid valve 288 is deenergized the outlet conduit 308 is in communication with the exhaust conduit 312. Thus, the front brake control is deactuated and the front brakes of the vehicle are released. Similarly, the solenoid valve 292 is supplied with pneumatic pressure through an inlet conduit 314 and when the valve is energized the inlet conduit communicates with the outlet conduit 316 which is connected with the rear brake control 304. When the valve 292 is deenergized the outlet conduit 316 communicates with the exhaust conduit 318. Thus when the solenoid valve 292 is energized the rear brakes of the vehicles are applied and when the solenoid valve is deenergized the rear brakes are released. The brakes may be controlled independently by the operator in a conventional manner at any time. The solenoid valve 294, as shown in FIG. 8, is adapted to control the actuation of a throttle retarder 322. The solenoid valve 294 has an inlet conduit 324 connected with a source of pneumatic pressure. It has an outlet conduit 326 which is connected with the throttle retarder 322 and it has an exhaust conduit 328. When the solenoid valve 294 is energized the inlet conduit 324 is connected with the outlet conduit 326 and the throttle retarder is actuated to retard the throttle position and reduce the speed of the vehicle. When the solenoid valve 294 is deenergized the outlet conduit 326 is connected with the exhaust conduit 328 and the throttle retarder is deactuated, allowing the vehicle operator to resume control of the throttle position.

Figure 5:
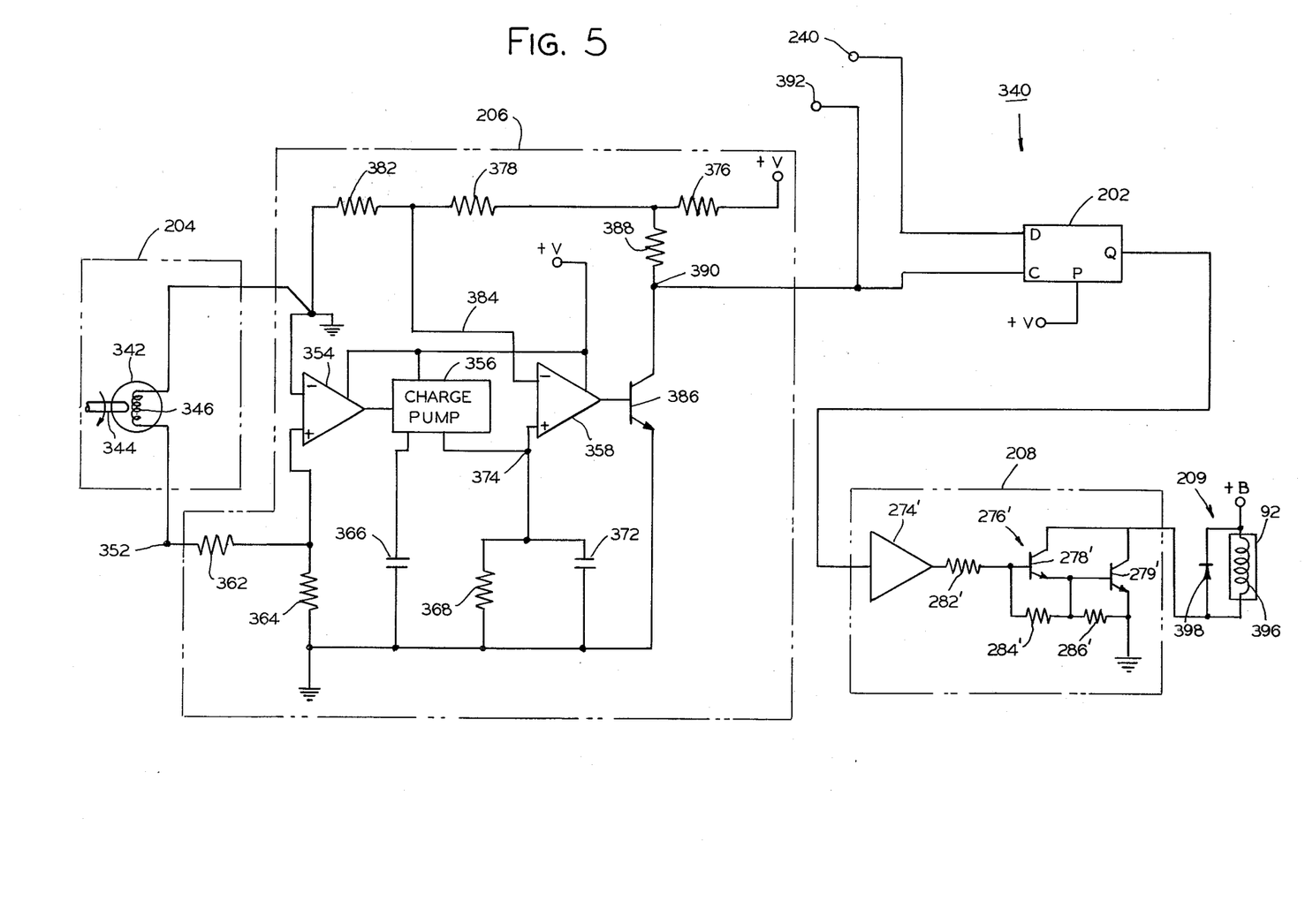

The reversing control channel 340 is shown in FIG. 5 along with the speed signal generator 204 and the inhibit signal means 206. Before describing the circuits of the reversing control channel 340 it will be helpful to consider the speed signal generator 204 and the inhibit signal means 206.

The speed signal generator 204 is adapted to produce an AC voltage having a frequency corresponding to the speed of the vehicle. It comprises an AC tachometer generator 342 having a rotor 344 suitably driven by the output shaft of the transmission, and it includes a stator winding 346. The rotor, suitably in the form of a toothed wheel with a permanent magnet, induces an AC voltage in the stator winding. The speed signal voltage is developed on an output terminal 352 and is applied to the input of the inhibit signal means 206.

The inhibit signal means 206 is a speed switch in the form of a frequency-to-voltage converter and comparator and is adapted to produce a logical high signal when the speed signal is below a predetermined value and to produce a logical low signal when the speed signal is above a predetermined value. The speed switch is preferably an integrated circuit type LM2907N-8 available from the National Semiconductor Company of San Jose, California. The inhibit signal means 206 comprises an input comparator 354, a charge pump 356 and an output comparator 358. The output of the speed signal generator 204 is applied through a resistor 362 to the noninverting input of the comparator 354. A resistor 364 is connected between the noninverting input and ground. The inverting input of the input comparator 354 is connected directly to ground. The input comparator is operative to produce a train of square-wave pulses having a repetition rate corresponding to the frequency of the speed signal. The output of the comparator 354 is applied to the input of the charge pump 356. The charge pump is provided with an external capacitor 366 and with an external circuit including a parallel resistor 368 and a capacitor 372. The charge pump 356 develops a DC output voltage having a magnitude corresponding to the frequency of the speed signal from the speed signal generator 204. This output voltage, which appears on terminal 374, is applied to the noninverting input of the output comparator 358. A speed reference voltage is applied to the inverting input of the comparator 358. The speed reference voltage is derived from a voltage divider including resistors 376, 378, and 382 connected between the voltage source and ground. A reference voltage is selected having a value which represents a predetermined speed low enough to allow reversal of the transmission to occur. This reference voltage is applied from the voltage divider through conductor 384 to the inverting input of the comparator 358. The comparator 358 is suitably provided with switching hysteresis about the set point to avoid instability in producing the inhibit signal. The output of the comparator 358 is applied to the base of an output transistor 386. The transistor 386 has its emitter connected to ground and its collector is connected through a resistor 388 and the resistor 376 to the voltage source. The output of the inhibit signal means 206 which represents the inhibit signal is derived from the output terminal 390 at the collector of the output transistor. The inhibit signal from the output terminal 390 is supplied to the input of the latch 202 and it is also applied through a conductor 392 to the input of the gate 214 of FIG. 4. The inhibit signal at the output terminal 390 is in a logical high state when the vehicle speed is below the predetermined value and is in a logical low state when the vehicle speed is above the predetermined value.

The latch 202 is adapted to produce an output logic signal of the same logic state as the direction command signal, provided that the inhibit signal at the clock input of the latch is in the logical high state which corresponds to vehicle speed below the predetermined value. The latch 202 is suitably of the integrated circuit type MC14042B available from Motorola. The direction command signal from the direction signal generator 200 of FIG. 4 is applied through conductor 240 to the data input of the latch 202. The inhibit signal from the inhibit signal means 206 is applied to the clock input of the latch 202. The polarity input of the latch 202 is connected to the voltage source and is held in the logical high state. With the polarity input in the logical high state, the Q output produces a logical signal of the same state as the data input signal, provided that the clock input is in a logical high state. A negative-going voltage from logical high to logical low at the clock input causes the Q output to latch and hold the logical state corresponding to the data input signal which existed just before the change of state of the clock signal. Thus, the Q output of the latch 202 will follow the changes in the direction command signal, provided that the inhibit signal is in the logical high state which indicates that the vehicle speed is below the predetermined value. However, if the inhibit signal is in the logical low state indicating that the vehicle is above the predetermined speed, a change in the direction command signal will not cause the Q output of the latch to change until after the vehicle speed is reduced below the predetermined value. The output of the latch 202 is applied to the input of the amplifier 208.

The amplifier 208 comprises circuitry which is identical to the amplifier 216. Because of the identity, the description will not be repeated here; instead like parts of the amplifier 208 are designated with the same reference characters as in amplifier 216, except that a prime symbol is added to the reference characters. The output of the amplifier 208 is applied to the forward-reverse control means 209. This control means comprises the forward-reverse solenoid valve 92 which was referred to in connection with FIG. 2 and which includes a solenoid winding 396 connected between the supply voltage and the output of the amplifier 208. A protective diode 398 is connected across the solenoid winding 396. When a direction command signal from the direction signal generator 200 causes the latch 202 to produce a logical high signal at its Q output, the transistor 278' and 279' in the amplifier 208 are turned on and the solenoid winding 396 is energized. When the solenoid winding 396 is energized the valve 92 is actuated to admit fluid pressure to the reversing control valve 58 causing the transmission to be shifted into reverse. When the solenoid valve 92 is deenergized, the transmission is shifted into forward.

Figure 6:
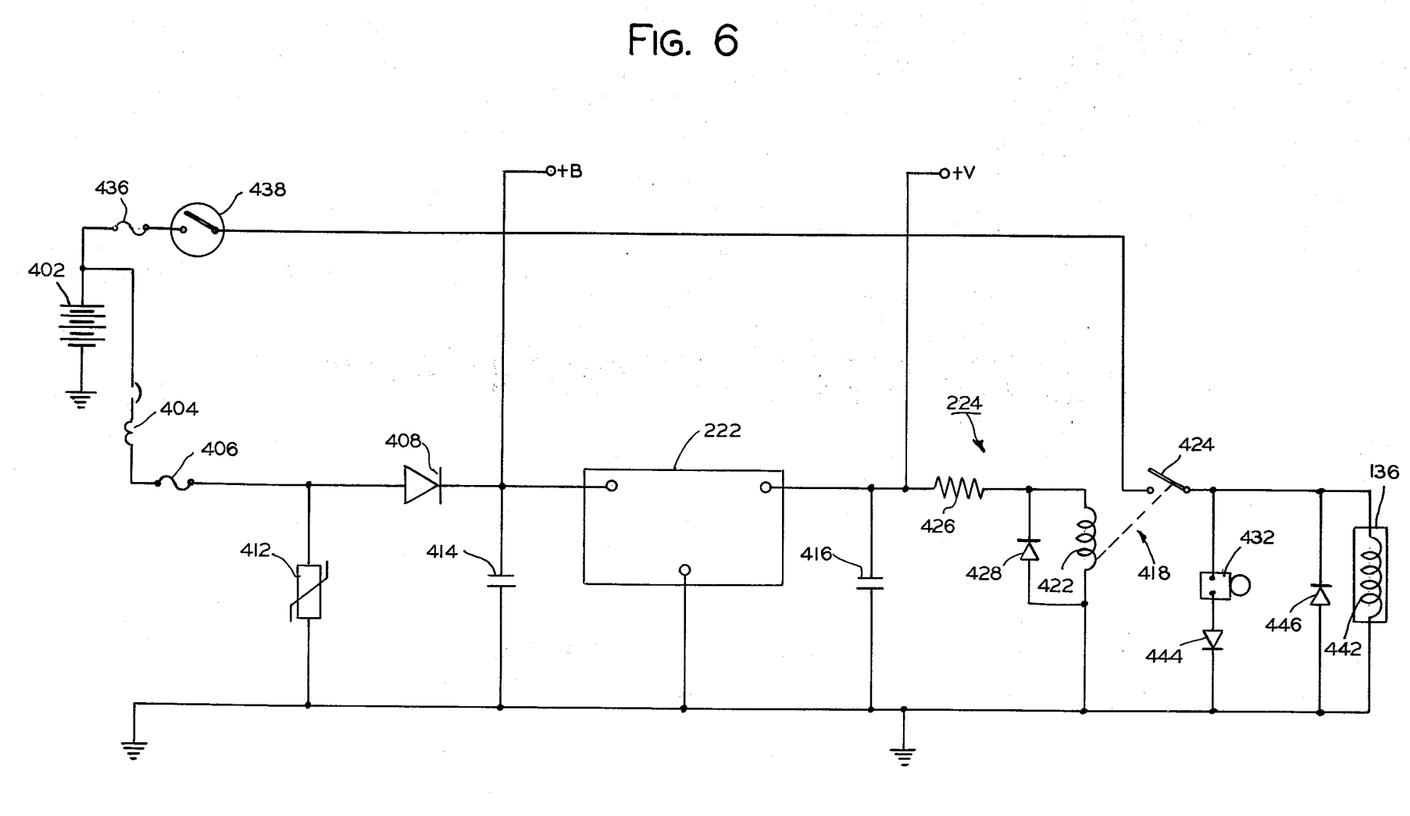

The power supply 222 for the electronic circuits and the logic power loss detector 224 are shown in FIG. 6. As shown in FIG. 6, the vehicle battery 402 is connected through a main circuit breaker 404, a fuse 406 and a diode 408 to the input of power supply 222 which is suitably an integrated circuit type MC-7815-CT available from Motorola. A transient suppresser 412 and a capacitor 414 are connected across the input lines of the power supply 222. The common terminal of the power supply is connected to gound. An unregulated supply voltage +B is taken across the input capacitor 414 and is used to supply the solenoid valves as shown in FIGS. 3, 4 and 5. The output of the power supply is connected across an output capacitor 416. The output of the power supply is a regulated logic level voltage +V which is supplied to the logic circuits of FIGS. 4 and 5.

The logic power loss detector 224 is connected with the output of the power supply 222 and comprises a relay 418 having a relay coil 422 and relay contacts 424. The output of the power supply is connected through a resistor 426 to the relay coil 422 and a protective diode 428 is connected across the coil. The relay contacts 424 are normally closed, i.e. the contacts are closed when the coil 422 is deenergized. If the logic power should fail, the relay 418 is adapted to energize an alarm signal 432 and the neutral safety solenoid valve 136, which was referred to in connection with FIG. 2. For this purpose, the supply voltage from the battery 402 is connected through a fuse 436 and a vehicle engine oil pressure switch 438 to the fixed contact of the relay contacts 424. The movable contact is connected with the alarm 432 and the solenoid winding 442 of the solenoid valve 136. A diode 444 is connected in series with the alarm 432 and a protective diode 446 is connected across the solenoid winding 442. In operation of the power loss detector, the relay contacts 424 are held open so long as the power supply 222 continues to supply logic level voltage +V at its output terminal. In the event the power supply 222 should fail with the loss of logic level voltage, the relay 418 will be deenergized and the relay contacts 424 will close. This will energize the alarm 432 to alert the vehicle driver and it will also energize the neutral safety solenoid valve 136 which causes the transmission to be shifted to neutral.

Figure 9:
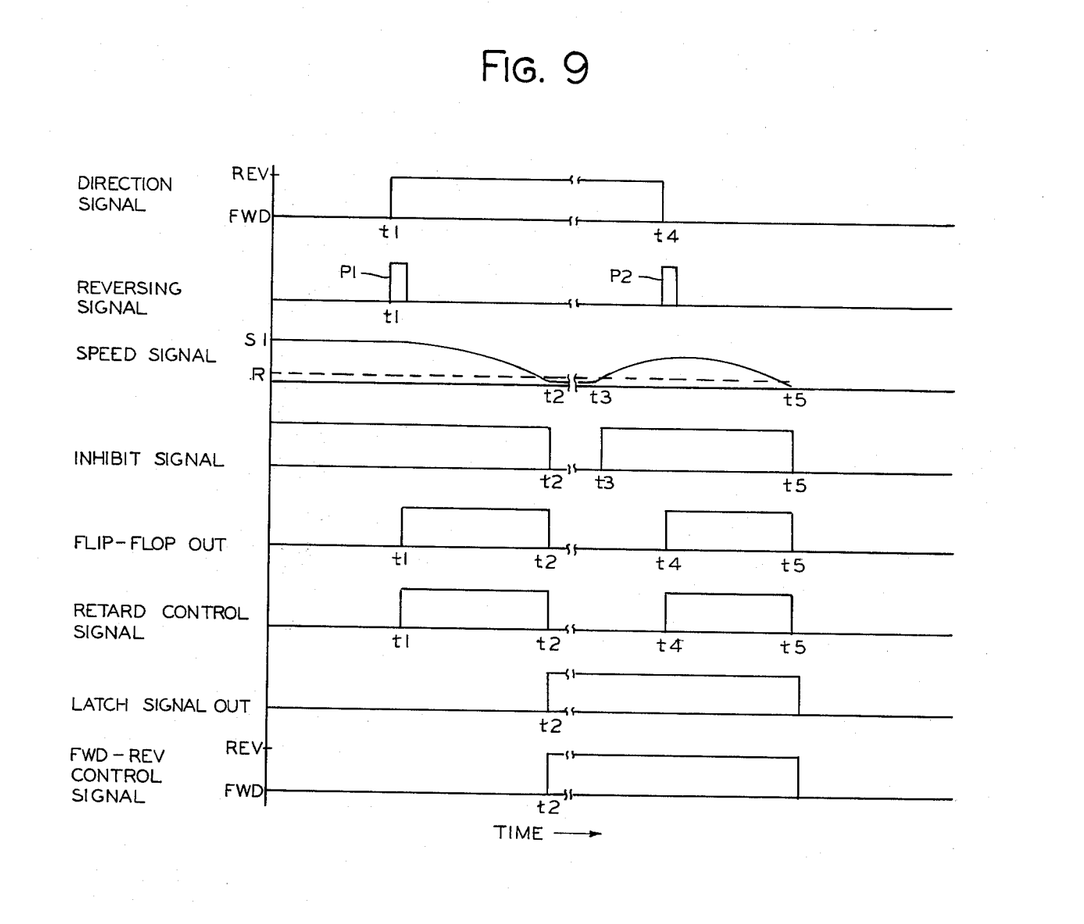
FIG. 9 is a timing diagram which illustrates the operation of the control system.

The operation of the reversing control system will now be described with reference to the timing diagram of FIG. 9. For explanatory purposes, it will be assumed that the vehicle initially is moving in the forward direction. As indicated in FIG. 9, the vehicle has a forward speed of S1, as indicated on the graph of the speed signal. It is noted that the inhibit signal means 206 is set so that the predetermined speed at which the vehicle is allowed to reverse is represented by a reference voltage R which is shown on the graph of the speed signal.

Under these conditions, it is assumed that at time t1 the operator shifts the reversing lever 52 from the forward position to the reverse position. This causes the direction signal generator 200 to produce a logical high signal as indicated in the graph of the direction command signal. This change of the direction command signal is applied to the reversing signal generator 212 which, in turn, produces a reversing command signal, i.e. a logical high pulse P1 at time t1. At this time, the speed signal generator 204 is producing a speed signal corresponding to the speed S1 which is greater than the predetermined speed represented by the reference voltage R. Accordingly, the inhibit signal means 206 produces a logical high signal, as indicated by the graph of the inhibit signal. The inhibit signal is applied to the clock input of the latch 202 and inhibits any change of state of the latch. The inhibit signal is also applied to the reset input of the flip-flop 272 of gate 214. The reversing signal pulse P1 at the clock input of the flip-flop 272 will cause a Q output of the flip-flop to go to logical high since the inhibit signal on the reset input is at logical high. This is shown in the graph of the flip-flop output signal. A logical high output of the flip-flop 272 turns the amplifier 216 on and the speed retarding means 218 is energized. This is indicated by the graph of the retard control signal. With the speed retarding control means energized, the vehicle brakes are applied and the throttle is retarded so that the vehicle speed is reduced in a controlled manner. At a time t2 vehicle speed is reduced to the predetermined value as represented by the reference voltage R on the graph of the speed signal. At this point, the inhibit signal means 206 changes state and the inhibit signal goes to logical low. This causes the flip-flop 272 to change state and the Q output goes to logical low and the retard control signal also goes to logical low and the retarding means 218 are deactuated. At the same time, the change in state of the inhibit signal which is applied to the latch 202 causes the latch to change state and the Q output thereof goes to logical high which corresponds to the command signal applied to the data input. This is shown in the graph of the latch signal at time t2. This causes the forward-reverse control signal to go to the logical high at time t2 and the reversing control means 209, i.e. the solenoid valve 92 is energized to shift the transmission into reverse.

With the transmission being shifted into reverse at time t2, the vehicle speed will drop momentarily to zero and then will gradually increase as indicated by the graph of the speed signal. When the speed has increased to the predetermined value represented by reference voltage R at time t3 the inhibit signal means 206 will change state and inhibit signal will go to logical high. This will have no effect on the retarding control means because the flip-flop 272 does not change state at this time. The inhibit signal at the reset input of the flip-flop is at logical high but there is no reversing signal pulse at the clock input and hence the Q output remains at logical low. The change of state of the inhibit signal at time t3 has no effect on the reversing control means; the logical high inhibit signal is applied to the clock input of the latch 202 but the direction command signal also remains at logical high and hence the Q output of the latch remains at logical high. Accordingly, the forward-reverse control signal remains at logical high at time t3. Assuming that the operator moves the reversing lever 52 to the forward position at time t4 the direction command signal is changed to logical low. At this time a reversing signal pulse P2 is produced by the reversing signal generator 212. The vehicle speed, as indicated by the speed signal is above the predetermined value and the inhibit signal prevents the latch 202 from changing state. However, the reversing signal pulse P2 causes the flip-flop 272 to change state and the Q output thereof goes to logical high at time t4. Accordingly, the retard control signal goes to logical high and the retarding control means 218 is energized. This causes the vehicle speed to be reduced in a controlled manner. When the vehicle speed is reduced to the predetermined value at time t5 the inhibit signal means 206 changes state and the inhibit signal goes to logical low. This causes the flip-flop 272 to change state and the Q output thereof and the retard control signal to go logical low which releases the brake and restores the throttle. At this same time t5 the latch signal goes to logical low and the forward-reverse control signal goes to logical low and the forward-reverse control means is deenergized causing the transmission to shift into forward.

Although the description of this invention has been given with reference to a particular embodiment, it is not to be construed in a limiting sense. Many variations and modifications will now occur to those skilled in the art. For a definition of the invention reference is made to the appended claims.

What is claimed is:

1. For use in a vehicle of the type having an engine coupled with traction wheels through a driveline including a change-speed transmission, said transmission including drive direction reversing means and direction selector means having a forward and reverse position, a drive reversing control system comprising a direction signal generator responsive to the position of said selector means for producing a direction command signal, first actuating means adapted to be connected with said reversing means and being responsive to the direction command signal, first gate means having a data input coupled with said direction signal generator, an output coupled with said first actuating means and having a clock input adapted to receive an inhibit signal, said first gate means being a storage gate means which produces on its output the state of the direction command signal applied to its data input in the absence of an inhibit signal on its clock input and which memorizes on its output the state of the direction command signal on its data input at the time an inhibit signal is applied to its clock input, a speed signal generator adapted to be connected with said driveline for producing a speed signal corresponding to the speed of the vehicle, inhibit signal means coupled with said speed signal generator for producing an inhibit signal only when said speed is above a predetermined value, said inhibit signal means being coupled with the clock input of the first gate means, whereby actuation of said reversing means is prevented when the vehicle speed is above said predetermined value.

2. The invention as defined in claim 1 wherein said first actuating means comprises an electrically controlled forward-reverse valve adapted to be operatively connected with the drive direction reversing means.

3. The invention as defined in claim 1 wherein the direction signal generator comprises a switching means for producing a digital logic direction command signal, said inhibit signal means comprising
   a comparator for producing a digital logic inhibit signal indicative of the vehicle speed relative to a predetermined speed,
   and said first gate means comprising a latch whereby said output produces a logic signal corresponding to the state of the direction command signal when the inhibit signal is in a given state, said output holding a state corresponding to the state of said direction command signal after said inhibit signal changes state.

4. The invention as defined in claim 3 wherein said first gate means is an integrated circuit latch.

5. The invention as defined in claim 3 wherein said direction signal generator comprises a manual selector lever, a fluid pressure control valve actuated by said lever, said switching means comprises a pressure sensitive switch connected with said control valve, said control valve being adapted to apply a first value of fluid pressure to said switch when the lever is in a first position and a second value of pressure when said lever in in a second position.

6. The invention as defined in claim 3 wherein said speed signal generator comprises an AC tachometer adapted to produce an AC voltage having a frequency corresponding to vehicle speed, and said inhibit signal means includes a frequency-to-voltage converter connected with said tachometer for producing a DC voltage corresponding to vehicle speed, said converter being connected with said comparator.

7. The invention as defined in claim 6 wherein said comparator has first and second inputs and an output, reference voltage means for producing a reference voltage corresponding to said predetermined vehicle speed and being connected with said first input, said frequency-to-voltage converter being connected to said second input whereby the output of the comparator provides an inhibit signal having one logic state when the vehicle speed is above the predetermined value and another logic state when the vehicle speed is below the predetermined value.

8. For use in a vehicle of the type having an engine coupled with traction wheels through a driveline including a change-speed transmission, said transmission including drive direction reversing means and direction selector means having a forward and reverse position, a drive reversing control system comprising a direction signal generator responsive to the position of said selector means for producing a direction command signal, first actuating means adapted to be connected with said reversing means and being responsive to the direction command signal, first gate means having a data input coupled with said direction signal generator, an output coupled with said first actuating means and having a clock input, a speed signal generator adapted to be connected with said driveline for producing a speed signal corresponding to the speed of the vehicle, inhibit signal means coupled with said speed signal generator for producing an inhibit signal only when said speed is above a predetermined value, said inhibit signal being coupled with the clock input of the first gate means, and adapted to inhibit a change in the output of the gate means to prevent actuation of said reversing means when the vehicle speed is above said predetermined value, speed retarding means, said reversing control system including a reversing signal generator coupled with said direction signal generator for producing a reversing command signal when said direction selector means is moved between foward and reverse positions, second actuating means adapted to be connected with said vehicle speed retarding means, second gate means, said reversing signal generator being coupled through said second gate means with said second actuating means.

9. The invention as defined in claim 2 wherein the reversing signal generator comprises pulse generating means for producing a digital logic pulse in response to a change of said direction command signal, and said second gate means comprises digital logic means having a first input connected with said reversing signal generator and a second input connected with the inhibit signal means, and having an output for producing a logic signal in response to said pulse when said inhibit signal is in a given logic state, said output changing state when said inhibit signal changes from said given state to another state.

10. The invention as defined in claim 9 wherein said second gate means is a D type flip-flop.

11. The invention as defined in claim 9 wherein said reversing signal generator comprises a monostable multivibrator.

12. The invention as defined in claim 8 wherein said second actuating means comprises an electrically controlled valve adapted to be operatively connected with vehicle speed retarding means.

13. The invention as defined in claim 1 or 8 including a power supply adapted to produce a logic level voltage, means connecting said power supply to said gate means, switching means connected with said power supply, a neutral control means adapted when energized to shift the transmission into neutral, said switching means being responsive to loss of voltage from said power supply for energizing said neutral control means.

14. The invention as defined in claim 13 wherein said switching means comprises a relay having a coil and contacts, a battery, said power supply being connected with said coil, and said contacts being connected between said battery and said neutral control means.

15. The invention as defined in claim 14 wherein the neutral control means is an electrically controlled valve adapted to shift said transmission to neutral.

* * * * *